(12) United States Patent
Tejeda et al.

(10) Patent No.: US 11,577,726 B2
(45) Date of Patent: Feb. 14, 2023

(54) VEHICLE ASSIST FEATURE CONTROL

(71) Applicant: Ford Global Technologies, LLC, Dearborn, MI (US)

(72) Inventors: Kenny Tejeda, Wixon, MI (US); Nial James Wykes, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 154 days.

(21) Appl. No.: 16/883,413

(22) Filed: May 26, 2020

(65) Prior Publication Data

US 2021/0370940 A1    Dec. 2, 2021

(51) Int. Cl.
*B60W 30/18*    (2012.01)
*B60W 50/14*    (2020.01)
*B60W 50/02*    (2012.01)

(52) U.S. Cl.
CPC .. *B60W 30/18009* (2013.01); *B60W 50/0205* (2013.01); *B60W 50/14* (2013.01); *B60W 2050/146* (2013.01)

(58) Field of Classification Search
CPC ....... B60W 30/18009; B60W 2300/185; B60T 2210/00; B60T 2210/10; B60T 2210/14; B60T 2210/16; B60G 2300/07; B60Y 2200/20; B60F 5/003; F02D 19/0618
See application file for complete search history.

(56) References Cited

U.S. PATENT DOCUMENTS

| | | |
|---|---|---|
| 6,356,837 B1 | 3/2002 | Yokota et al. |
| 7,003,397 B2 | 2/2006 | Yokota et al. |
| 7,407,028 B2 | 8/2008 | Tanaka |
| 8,275,542 B2 | 9/2012 | Adachi et al. |
| 8,284,995 B2 | 10/2012 | Diaz et al. |
| 8,983,717 B2 | 3/2015 | Pupin et al. |
| 9,174,538 B2 | 11/2015 | Zawade et al. |
| 10,013,617 B2 | 7/2018 | Zhao et al. |
| 10,099,372 B2 | 10/2018 | Vu et al. |
| 10,836,382 B2 | 11/2020 | Schneider et al. |
| 2007/0021912 A1 | 1/2007 | Morita et al. |
| 2007/0032913 A1 | 2/2007 | Ghoneim et al. |

(Continued)

FOREIGN PATENT DOCUMENTS

| | | |
|---|---|---|
| DE | 102005051910 A1 | 9/2006 |
| DE | 102013209242 A1 | 11/2014 |
| WO | 2020047065 A1 | 3/2020 |

OTHER PUBLICATIONS

Non-Final Office Action dated Nov. 28, 2022 re U.S. Appl. No. 17/211,933, filed Mar. 25, 2021.

*Primary Examiner* — Christian Chace
*Assistant Examiner* — Jordan S Fei
(74) *Attorney, Agent, or Firm* — Frank A. MacKenzie; Bejin Bieneman PLC

(57) ABSTRACT

Upon determining a vehicle is in an off-road area based on sensor data, an off-road operation mode is enabled to an enabled state. Then, upon receiving a first user input selecting the off-road operation mode, one or more assist features are represented on a display in the vehicle. Then at least one of the assist features is selected based on a second user input. Then, after a key cycle initiated by a user that engages the vehicle from an off state to an on state, the selected assist feature is deactivated to a deactivated state.

20 Claims, 6 Drawing Sheets

(56) References Cited

U.S. PATENT DOCUMENTS

| | | |
|---|---|---|
| 2017/0205246 A1 | 7/2017 | Koenig et al. |
| 2018/0001895 A1 | 1/2018 | Fairgrieve et al. |
| 2018/0023963 A1 | 1/2018 | Foltin |
| 2018/0290590 A1 | 10/2018 | Goldman-Shenhar et al. |
| 2018/0319402 A1 | 11/2018 | Mills et al. |
| 2018/0356798 A1* | 12/2018 | Ciovnicu .......... B60C 23/00372 |
| 2019/0077406 A1* | 3/2019 | Dudar ................... B60W 40/06 |
| 2020/0206928 A1 | 7/2020 | Denenberg et al. |
| 2020/0272123 A1 | 8/2020 | Denenberg et al. |
| 2020/0393835 A1 | 12/2020 | Gregg et al. |

* cited by examiner

VEHICLE ASSIST FEATURE CONTROL

BACKGROUND

Vehicles may include assist features, e.g., blind spot monitor, adaptive cruise control, lane departure warning, lane centering, etc., to aid a user operating the vehicle. Assist features may be adaptive features that actuate one or more vehicle components based on vehicle data, e.g., a sensed location, sensed environmental conditions, etc.

DETAILED DESCRIPTION

Figure 1:
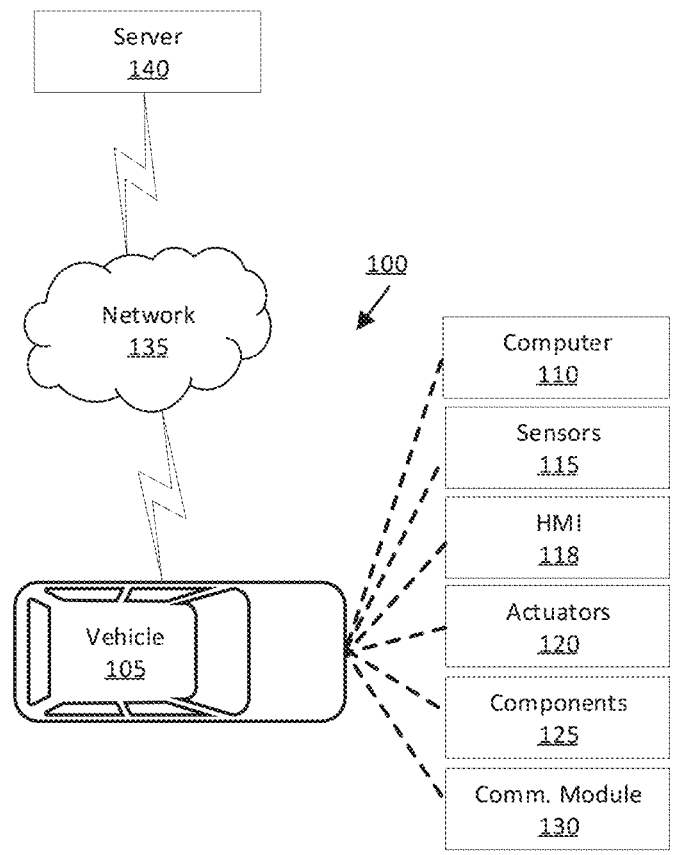
FIG. 1 is a block diagram illustrating an example vehicle control system for a vehicle.

A system includes a computer including a processor and a memory, the memory storing instructions executable by the processor to upon determining a vehicle is in an off-road area based on sensor data, enable an off-road operation mode of the vehicle to an enabled state. The instructions further include instructions to then, upon receiving, a first user input selecting the off-road operation mode, represent one or more assist features on a display in the vehicle. The instructions further include instructions to then select at least one of the assist features based on a second user input. The instructions further include instructions to then, after a key cycle initiated by a user that engages the vehicle from an off state to an on state, deactivate the selected assist feature to a deactivated state.

The instructions can further include instructions to, upon determining the vehicle has moved from the off-road area to a road area, disable the off-road operation mode to a disabled state and activate the deactivated assist feature to an activated state.

The instructions can further include instructions to, upon receiving a third user input deselecting the off-road operation mode, disable the off-road operation mode to a disabled state and activate the deactivated assist feature to an activated state.

The instructions can further include instructions to, upon receiving a third user input selecting at least one deactivated assist feature, activate the selected assist feature to an activated state.

The instructions can further include instructions to select at least one assist feature based further on a previous selection.

The instructions can further include instructions to, after the key cycle, verify the vehicle is on the off-road area based on sensor data.

The instructions can further include instructions to prevent transition of the off-road operation mode to the enabled state based on determining the vehicle is operating in a road area.

The instructions can further include instructions to, after another key cycle, maintain the deactivated assist feature in the deactivated state based on determining the vehicle is in the off-road area via vehicle sensor data.

The instructions can further include instructions to prevent a diagnostic test of the deactivated assist feature.

The instructions can further include instructions to, upon activating the deactivated assist feature to an activated state, perform a diagnostic test of the activated assist feature.

A method includes upon determining a vehicle is in an off-road area based on sensor data, enabling an off-road operation mode of the vehicle to an enabled state. The method further includes then, upon receiving, a first user input selecting the off-road operation mode, representing one or more assist features on a display in the vehicle. The method further includes then selecting at least one of the assist features based on a second user input. The method further includes then, after a key cycle initiated by a user that engages the vehicle from an off state to an on state, activating the selected assist feature to a deactivated state.

The method can further include, upon determining the vehicle has moved from the off-road area to a road area, deactivating the off-road operation mode to a disabled state and activating the deactivated assist feature to an activated state.

The method can further include, upon receiving a third user input deselecting the off-road operation mode, deactivating the off-road operation mode to a disabled state and activating the deactivated assist feature to an activated state.

The method can further include, upon receiving a third user input selecting at least one deactivated assist feature, activating the selected assist feature to an activated state.

The method can further include selecting at least one assist feature based further on a previous selection.

The method can further include, after the key cycle, verifying the vehicle is in the off-road area based on sensor data.

The method can further include preventing transition of the off-road operation mode to the enabled state based on determining the vehicle is operating in a road area.

The method can further include, after another key cycle, maintaining the deactivated assist feature in the deactivated state based on determining the vehicle is in the off-road area via vehicle sensor data.

The method can further include preventing a diagnostic test of the deactivated assist feature.

The method can further include, upon activating the deactivated assist feature to an activated state, performing a diagnostic test of the activated assist feature.

Further disclosed herein is a computing device programmed to execute any of the above method steps. Yet further disclosed herein is a computer program product, including a computer readable medium storing instructions executable by a computer processor, to execute an of the above method steps.

FIG. 1 is a block diagram illustrating an example vehicle system 100. A vehicle 105 includes a vehicle computer 110 that receives data from sensors 115. The vehicle computer 110 is programmed to, upon determining a vehicle 105 is in an off-road area based on sensor 115 data, enable an off-road operation mode of the vehicle 105 to an enabled state. The vehicle computer 110 is further programmed to then, upon receiving a first user input selecting the off-road operation mode, represent one or more assist features on a display in the vehicle 105. The vehicle computer 110 is further programmed to then select at least one of the assist features based on a second user input. The vehicle computer 110 is further programmed to then, after a key cycle initiated by a user that engages the vehicle 105 from an off state to an on state, deactivate the selected assist feature to a deactivated state.

The vehicle 105 includes one or more assist features. An assist feature is an operation in a vehicle to actuate one or more vehicle components 125 to assist or supplement user operation of the vehicle. For example, the vehicle computer 110 can at least partially control the vehicle 105 based on the assist features. An example assist feature is lane-keeping, in which the vehicle computer 110 controls actuators 120 and/or components 125 to maintain the vehicle 105 in a lane of a road area. The vehicle computer 110 can receive sensor 115 data, e.g., indicating road markings, signs, other vehicles, etc., and can initiate an assist feature, the assist feature including to actuate one or more vehicle components 125 based on the sensor 115 data. However, when the vehicle 105 is operating in an off-road area, the vehicle computer 110 may initiate one or more assist features appropriate or desirable only for on-road, and not off-road, areas based on the received sensor 115 data. Advantageously, upon determining that the vehicle 105 is in an off-road area based on sensor 115 data, the vehicle computer 110 can enable an off-road operation mode that allows the user to selectively deactivate one or more assist features to prevent undesired actuation of the selected assist features thereby improving vehicle operation in the off-road area.

The vehicle 105 includes the vehicle computer 110, sensors 115, actuators 120 to actuate various vehicle components 125, and a vehicle communications module 130. The communications module 130 allows the vehicle computer 110 to communicate with a server 140 and/or another vehicle, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, other vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a conventional form, e.g., geo-coordinates such as latitude and longitude coordinates obtained via a navigation system, as is known, that uses the Global Positioning System (GPS). Additionally, or alternatively, the data can include a location of an object, e.g., another vehicle, a sign, a tree, a shrub, etc., relative to the vehicle 105. As one example, the data may be image data of the environment around the vehicle 105. In such an example, the image data may include one or more objects and/or markings, e.g., painted lines, symbols, text, etc., on a ground surface, e.g., in a ground area in which the vehicle 105 is operating. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by pressing a virtual button on a touchscreen display, by providing voice commands, etc. For example, a touchscreen display included in an HMI 118 may include sensors 115 to detect that a user pressed a virtual button on the touchscreen display to, e.g., select or deselect the off-road operation more, select or deselect at least one assist feature, etc., which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a server 140 (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet or some other wide area network.

The vehicle computer 110 is programmed to determine whether the vehicle 105 is in a road area or an off-road area. A road area is an area of ground surface that includes any paved or finished surface provided for land vehicle travel. An off-road area is an area of ground surface that includes any surface not altered to provide for vehicle travel.

The vehicle computer 110 may, for example, determine whether the vehicle 105 is in the road area or the off-road area based on data, e.g., map data, received from a remote computer, e.g., a server 140. For example, the vehicle computer 110 may receive a location of the vehicle 105, e.g., from a sensor 115, a navigation system, a remote computer, etc. The vehicle computer 110 can compare the location of the vehicle 105 to the map data, e.g., to determine whether the vehicle 105 is in the road area or the off-road area specified in the map data. As another example, the vehicle computer 110 can determine the vehicle 105 is in the road area based on GPS-based geo-fencing. In such an example, the GPS geo-fence specifies a perimeter of a road area. The vehicle computer 110 can determine the vehicle 105 is in the road area based on the location data of the vehicle 105 indicating the vehicle 105 is within a geo-fence that specifies the road area. Conversely, the vehicle computer 110 can determine the vehicle 105 is in an off-road area based on the location data of the vehicle 105 indicating the vehicle 105 is not within a geo-fence that specifies a road area.

Alternatively, the vehicle computer 110 can receive and analyze image data from one or more sensors 115 to determine an on-road area or an off-road area. In such an example, the image data includes the environment around the vehicle 105. The vehicle computer 110 can determine the vehicle 105 is in the road area or the off-road area based on identifying objects and/or markings in the image data, e.g., using image recognition techniques. For example, the vehicle computer 110 can determine the vehicle 105 is in a road area based on identifying lane markers, i.e., painted lines in the road area defining one or more lanes in the road area, in the image data. As another example, the vehicle computer 110 can determine the vehicle 105 is in an off-road area based on identifying a terrain of vehicle operation.

The vehicle computer 110 is programmed to transition an off-road operation mode between a disabled state and an enabled state based on the location of the vehicle 105. For example, upon determining that the vehicle 105 has moved from a road area to an off-road area, the vehicle computer 110 enables the off-road operation mode from the disabled state to the enabled state. As another example, upon determining that the vehicle 105 has moved from an off-road area to a road area, the vehicle computer 110 disables the off-road operation mode from the enabled state to the disabled state. That is, the off-road operation mode is enabled when the vehicle 105 is in an off-road area and is disabled when the vehicle 105 is in the road area.

Additionally, the vehicle computer 110 is programmed to maintain the off-road operation mode in one of the enabled state or the disabled state based on the vehicle 105 remaining in an off-road area or road area, respectively. For example, following each key cycle, the vehicle computer 110 verifies the vehicle 105 is in a road area or an off-road area based on sensor 115 data. For example, the vehicle computer 110 can verify the vehicle 105 is in a road area or an off-road area based on location data of the vehicle 105 and/or image data, as described above. The vehicle computer 110 then compares the location of the vehicle 105 after the key cycle to the location of the vehicle 105 before the key cycle. If the vehicle 105 is in a road area before and after the key cycle, then the vehicle computer 110 maintains the off-road operation mode in the disabled state. Similarly, if the vehicle 105 is in an off-road area before and after the key cycle, then the vehicle computer 110 maintains the off-road operation mode in the enabled state.

A key cycle engages the vehicle 105 between an on-state, i.e., an engine is operating, and an off-state, i.e., the engine is not operating. Specifically, the key cycle engages the vehicle 105 from the on-state to the off-state and back to the on-state. Each key cycle may be initiated by a user, e.g., turning a key in an ignition, by pressing a push-button, etc.

Figure 2A:
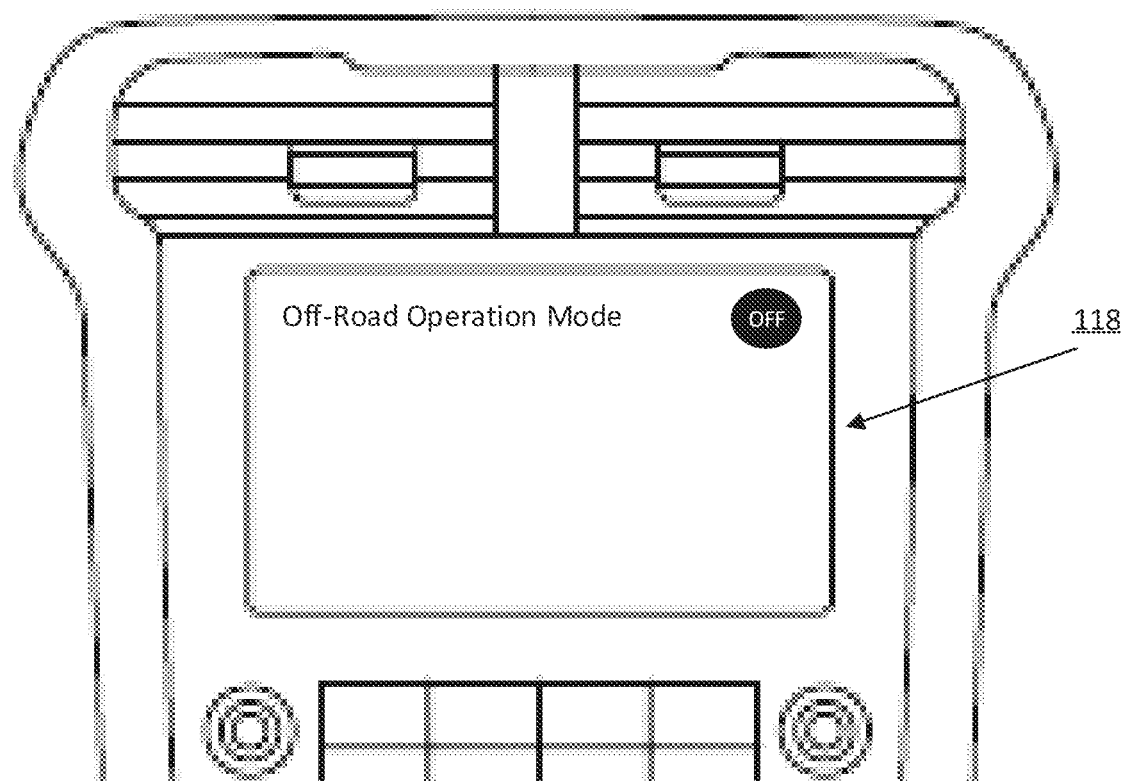
FIGS. 2A-2B are diagrams of an example HMI display based on the vehicle being in a road area or an off-road area, respectively.
Figure 2B:
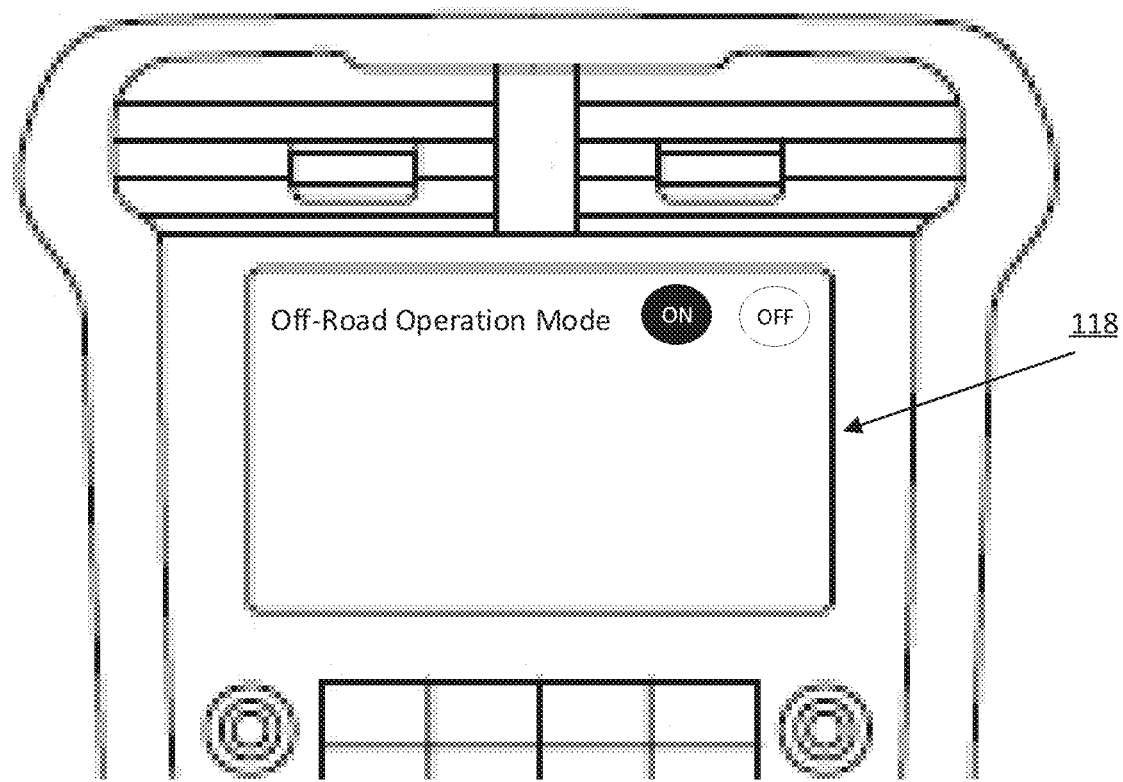

The off-road operation mode deactivates assist features selected based on user input. When the off-road operation mode is in the enabled state, the vehicle computer 110 enables user selection of the off-road operation mode. For example, the vehicle computer 110 may actuate the HMI 118 to detect a first user input selecting the off-road operation mode. For example, the HMI 118 may be programmed to display a virtual button on a touchscreen display that the user can press to select the off-road operation mode (see FIG. 2B). As another example, the HMI 118 may be programmed to make a virtual button, which is non-selectable when the off-road operation mode is in the disabled state, selectable via the touchscreen display when the off-road operation mode is in the enabled state. In other words, the HMI 118 may activate sensors 115 that can detect the user pressing the virtual button to select the off-road operation mode. Upon detecting the first user input, the HMI 118 can then provide the first user input to the vehicle computer 110, and the vehicle computer 110 can select the off-road operation mode based on the first user input.

Additionally, in the enabled state, the vehicle computer 110 can enable user selection of one or more assist features (as discussed below) based on the selection of the off-road operation mode, whereupon these features are activated in the off-road operation mode. Further, in the enabled state, the vehicle computer 110 can set a flag to detect a key cycle following the selection of the off-road operation mode. Upon detecting the key cycle, the vehicle computer 110 can deactivate selected assist features (as discussed below).

When the off-road operation mode is in the disabled state, the vehicle computer 110 may actuate the HMI 118 to disable detection of the first user input and the second user input. Said differently, the vehicle computer 110 prevents the user from selecting the off-road operation mode and/or deactivating one or more assist features in the disabled state, i.e., when the vehicle 105 is on a road area. For example, the HMI 118 may be programmed to remove a virtual button from the touchscreen display (see FIG. 2A). As another example, the HMI 118 may be programmed to make the virtual button non-selectable. In other words, the HMI 118 may deactivate sensors 115 that can detect the user pressing the virtual button to select the off-road operation mode. Additionally, the vehicle computer 110 may remove the flag to detect a key cycle when the off-road operation mode is in the disabled state.

Figure 2C:
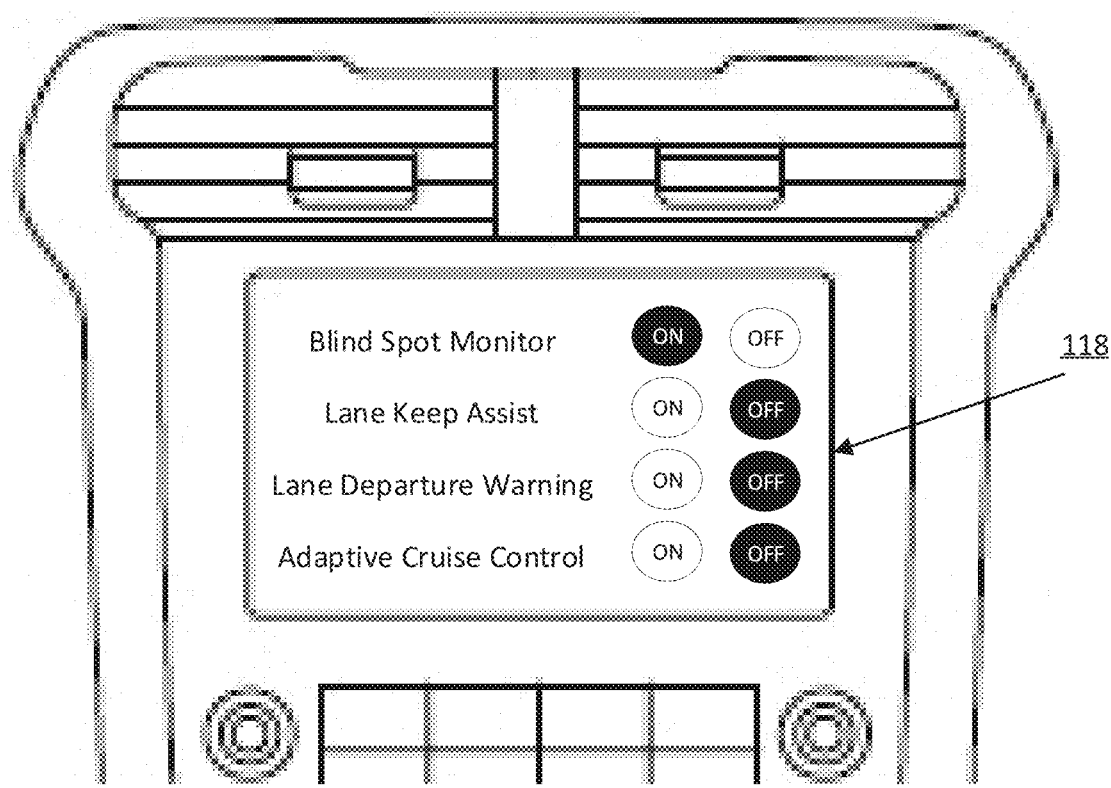
FIG. 2C is a diagram of one or more assist features being represented on the HMI.

The vehicle computer 110 is programmed to represent one or more assist features via the HMI 118, e.g., on the touchscreen display, upon receiving the first user input. For example, the vehicle computer 110 can actuate the HMI 118 to display one respective virtual button for each assist feature on the touchscreen display (see FIG. 2C). Non-limiting examples of assist features include: blind spot monitoring, lane departure warning, lane keep assist, lane centering, adaptive cruise control, forward collision warning, etc. Additionally or alternatively, the vehicle computer 110 may represent one or more vehicle components 125, e.g., passive restraint systems, on the touchscreen display based on receiving the first user input. In such an example, the vehicle computer 110 may actuate the HMI 118 to display one respective virtual button for each vehicle component 125. The assist features and/or vehicle components 125 may be specified by a vehicle and/or component manufacturer and stored in a memory of the vehicle computer 110.

The vehicle computer 110 is programmed to select one or more assist features based on the second user input. The HMI 118 can detect the second user input selecting at least one assist feature and can provide the second user input to the vehicle computer 110. For example, the sensors 115 in the HMI 118 can detect the user pressing a virtual button selecting an assist feature (see FIG. 2C). The vehicle computer 110 can then select the assist feature(s) based on the second user input. Additionally, or alternatively, the vehicle computer 110 can select one or more assist features based on a previous selection. For example, the vehicle computer 110 can store a second user input in a memory. That is, the vehicle computer 110 can store the one or more assist features selected by the second user input. Upon receiving a subsequent first user input, the vehicle computer 110 can then select the same assist feature(s) as the stored second user input.

Upon selecting the assist features, the vehicle computer 110 may be programmed to output a message to the user. For example, the vehicle computer 110 may actuate the HMI 118 to display the message via the touchscreen display. As another example, the vehicle computer 110 may actuate the HMI 118 to provide an audio message via speakers in the vehicle 105. The message may instruct the user to perform a key cycle, i.e., to engage the vehicle 105 from the on-state to the off-state and back to the on-state, to confirm the selected assist features.

Upon verifying the vehicle 105 is in the off-road area after the key cycle, as described above, the vehicle computer 110 deactivates the selected assist feature(s), i.e., disables the selected assist feature(s) from the activated state to the deactivated state. That is, the selected assist features remain in the activated state following the second user input until the user initiates a key cycle. In the deactivated state, the vehicle computer 110 suppresses the assist feature(s). That is, the vehicle computer 110 does not initiate the deactivated assist feature(s) to supplement or assist the user in operating the vehicle 105 in an off-road area.

In the activated state, the vehicle computer 110 operates the vehicle 105 based at least partially on the assist features. For example, the vehicle computer 110 may initiate one or more assist features to supplement or assist the user in operating the vehicle 105 in a road area based on sensor 115 data. That is, the vehicle computer 110 can actuate one or more vehicle components 125 to adjust operation of the vehicle 105 based on the environment around the vehicle 105. For example, the vehicle computer 110 can adjust the speed of the vehicle 105, e.g., according to on the speed of other vehicles operating in the road area, based on an adaptive cruise control assist feature. As another example, the vehicle computer 110 can operate the vehicle 105 to maintain at least a minimum distance from a vehicle in front of the vehicle 105 in a same lane on the road area. As yet another example, the vehicle computer 110 can according to a lane-keeping assist feature adjust lateral movement of the vehicle 105 within a lane of the road area.

Additionally, the vehicle computer 110 can receive diagnostic data from one or more ECUs, e.g., a restraint control module, a body control module, etc., after each key cycle. For example, the one or more ECUs may be programmed to perform a diagnostic test to determine whether an assist feature is capable of operation, i.e., can operate within specified parameters, e.g., specified by a vehicle and/or component manufacturer. That is, the one or more ECUs can perform a conventional self-diagnostic test to detect faults in the assist feature to confirm that the assist feature is operational. If the assist feature is not capable of operation, the diagnostic test can output a fault, and the vehicle computer 110 can identify the fault in the assist feature. That is, if the vehicle computer 110 identifies a fault in the assist feature, the diagnostic data indicates that the assist feature is not capable of operation and requires repair or replacement.

The vehicle computer 110 deactivates the selected assist feature(s) after the key cycle to prevent incorrectly identifying a fault in the selected assist feature(s). For example, the vehicle computer 110 can receive diagnostic data of each assist feature in an activated state and can suppress diagnostic data of the deactivated assist feature(s). That is, the vehicle computer 110 can prevent the one or more ECUs from performing a diagnostic test on the deactivated assist feature(s). Suppressing the diagnostic data of the deactivated assist feature(s) can prevent the vehicle computer 110 from identifying a fault in the assist feature(s) deactivated based on the second user input.

Additionally, the vehicle computer 110 may be programmed to record the deactivation of the selected assist feature(s). For example, upon the vehicle computer 110 deactivating the selected assist feature(s) to the deactivated state, the vehicle computer 110 can store in a memory data indicating the deactivation of the assist feature(s), e.g., including a time of day of the second user input, a time of day of the key cycle, a location of the vehicle 105, the deactivated assist feature(s), etc.

The vehicle computer 110 is programmed to activate each deactivated assist feature to the activated state based on disabling the off-road operation mode to the disabled state. That is, each assist feature is in the activated state when the vehicle 105 is operating in the road area. Upon the assist feature being activated from the deactivated state to the activated state, the vehicle computer 110 can instruct the respective ECU(s) to perform the diagnostic test (as described above) on the activated assist features. That is, the vehicle computer 110 can determine the assist features are operational upon activation to the activated state based on the diagnostic data.

Additionally or alternatively, the vehicle computer 110 may be programmed to activate at least one assist feature from the deactivated state to the activated state based on a third user input. For example, the HMI 118 may detect the third user input deselecting the off-road operation mode, e.g., the user pressing the virtual button to deselect the off-road operation mode, and provide the third user input to the vehicle computer 110. In such an example, the vehicle computer 110 can then activate each deactivated assist feature to the activated state based on the third user input. As another example, the HMI 118 may detect the third user input deselecting one or more deactivated assist features, e.g., a user pressing a virtual button to deselect a deactivated assist feature, and provide the third user input to the vehicle computer 110. In such an example, the vehicle computer 110 can then activate the selected assist feature(s) to the activated state based on the third user input.

Figure 3A:
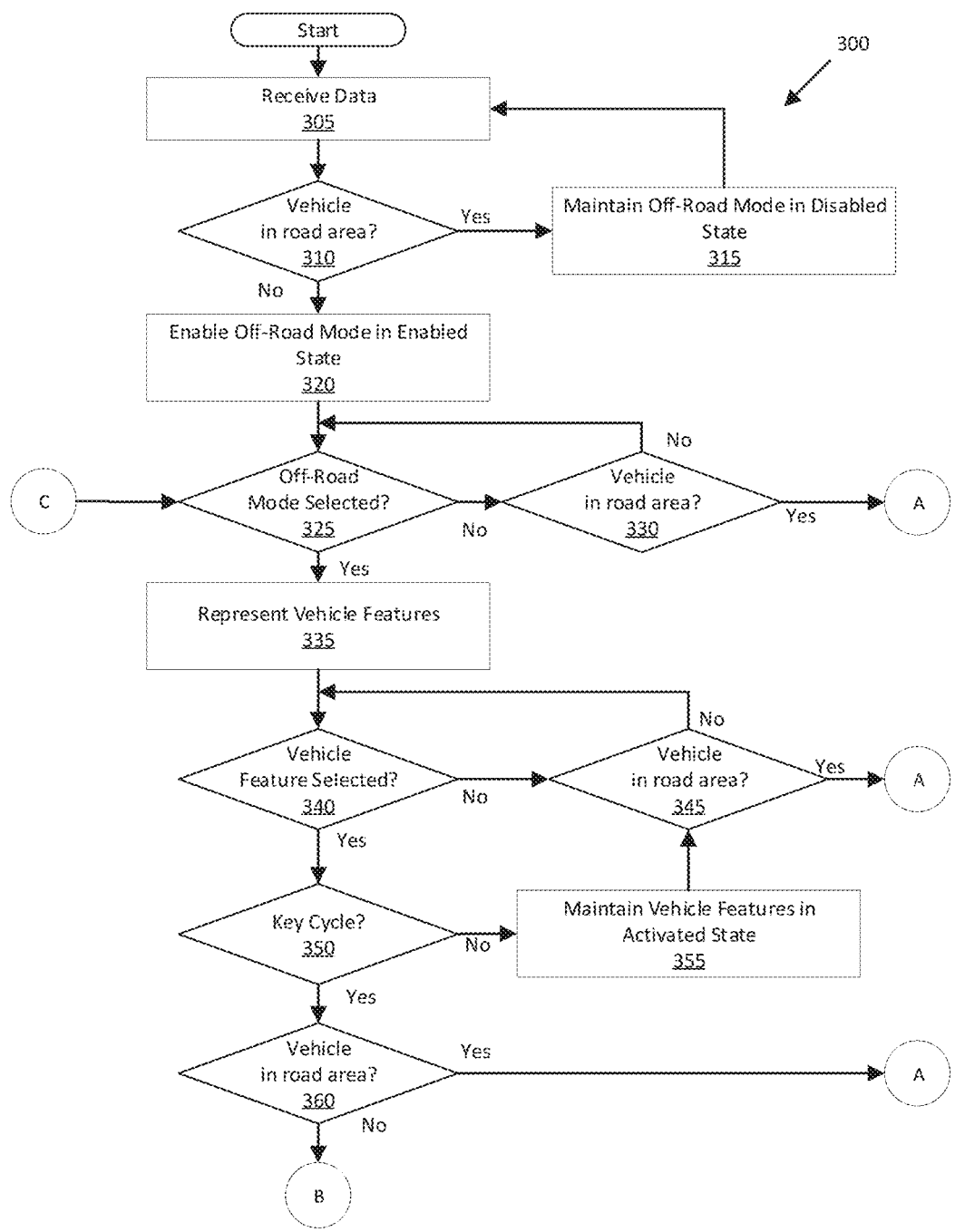
FIG. 3A is a first part of a flowchart of an example process for controlling an off-road operation mode in the vehicle.

FIG. 3A is a first portion of a flowchart of an example process 300 (the second portion being shown in FIG. 3B because the entire flowchart will not fit on a single drawing sheet) for controlling an off-road operation mode in a vehicle 105. The process 300 begins in a block 305.

In the block 305, a vehicle computer 110 receives data from one or more sensors 115 and/or from a remote computer, e.g., a server 140. For example, the data may be map data, e.g., from a server 140 via the network 135, including a location of the vehicle 105 and a location of a road area, e.g., each specified in geo-coordinates. Additionally or alternatively, the data may be image data, e.g., from one or more sensors 115 via the vehicle network, including the environment around the vehicle 105, e.g., a terrain of vehicle operation, one or more objects, etc. The process 300 continues in a block 310.

In the block 310, the vehicle computer 110 determines whether the vehicle 105 is operating in a road area based on the received data, e.g., image data and/or map data. For example, the vehicle computer 110 can compare the location of the vehicle 105 to the location of the road area specified by the map data (e.g., to determine whether the vehicle 105 is within a geo-fence of the road area), as discussed above. Additionally or alternatively, the vehicle computer 110 can analyze the image data, e.g., using image processing techniques, to identify a terrain of vehicle operation, one or more objects around the vehicle 105, etc., as discussed above. If the vehicle computer 110 determines that the vehicle 105 is not in a road area, i.e., is in an off-road area, then the process 300 continues in a block 320. Otherwise, the process 300 continues in a block 315.

In the block 315, the vehicle computer 110 maintains the off-road operation mode in a disabled state. For example, the vehicle computer 110 can maintain the off-road operation mode in the disabled state upon determining that the vehicle 105 remains in the road area. In the disabled state, the vehicle computer 110 prevents user selection of the off-road operation mode. Additionally, each assist feature is in an activated state when the off-road operation mode is in the disabled state. That is, the vehicle computer 110 may initiate any one of the assist features to supplement or assist user operation of the vehicle 105 in a road area, e.g., based on sensor 115 data. The process 300 returns to the block 305.

In the block 320, the vehicle computer 110 enables the off-road operation mode in an enabled state. For example, upon determining that the vehicle 105 has moved from a road area to an off-road area, the vehicle computer 110 enables the off-road operation mode from the disabled state to the enabled state. Additionally, the vehicle computer 110 can maintain the off-road operation mode in the enabled state upon determining that the vehicle 105 remains in the off-road area. In the enabled state, the vehicle computer 110 enables user selection of the off-road operation mode. The process 300 continues in a block 325.

In the block 325, the vehicle computer 110 determines whether the off-road operation mode is selected. For example, in the enabled state, the vehicle computer 110 may actuate an HMI 118 to detect a first user input selecting the off-road operation mode, as discussed above. In other words, the HMI 118 may activate sensors 115 that can detect the first user input, e.g., the user pressing a virtual button on a touchscreen display to select the off-road operation mode. Upon detecting the first user input, the HMI 118 can then provide the first user input to the vehicle computer 110, and the vehicle computer 110 can select the off-road operation mode based on the first user input. If the vehicle computer 110 receives the first user input selecting the off-road operation mode, then the process 300 continues in a block 335. Otherwise, the process 300 continues in a block 330.

In the block 330, the vehicle computer 110 determines whether the vehicle 105 is operating in a road area based on data, e.g., image data and/or map data. For example, the vehicle computer 110 can compare the location of the vehicle 105 to the location of a road area specified by the map data, as discussed above. Additionally or alternatively, the vehicle computer 110 can analyze the image data, e.g., using image processing techniques, to identify a terrain of vehicle operation, one or more objects around the vehicle 105, etc., as discussed above. If the vehicle computer 110 determines that the vehicle 105 is operating in the road area, then the process 300 continues in a block 385. Otherwise, the process 300 returns to the block 325.

In the block 335, the vehicle computer 110 represents one or more assist features. For example, the vehicle computer 110 may actuate the HMI 118 to display one respective virtual button for each assist feature on a touchscreen display. Additionally, the vehicle computer 110 may represent one or more vehicle components 125, e.g., a passive restraint system, via the HMI 118. The displayed assist features and/or vehicle components 125 may be specified by a vehicle and/or component manufacturer, as discussed above. The process 300 continues in a block 340.

In the block 340, the vehicle computer 110 determines whether at least one assist feature is selected based on a second user input. For example, the sensors 115 of the HMI 118 can detect the second user input, e.g., the user pressing a virtual button selecting an assist feature, as discussed above. The HMI 118 can then provide the second user input to the vehicle computer 110, and the vehicle computer 110 can then select the assist feature(s) based on the second user input. Additionally, or alternatively, the vehicle computer 110 can select one or more assist features based on a previous selection, as discussed above. If the vehicle computer 110 determines at least one assist feature is selected, then the process 300 continues in a block 350. Otherwise, the process 300 continues in a block 345.

In the block 345, the vehicle computer 110 determines whether the vehicle 105 is operating in a road area based on data, e.g., image data and/or map data. For example, the vehicle computer 110 can compare the location of the vehicle 105 to the location of a road area specified by the map data, as discussed above. Additionally or alternatively, the vehicle computer 110 can analyze the image data, e.g., using image processing techniques, to identify a terrain of vehicle operation, one or more objects around the vehicle 105, etc., as discussed above. If the vehicle computer 110 determines that the vehicle 105 is operating in the road area, then the process 300 continues in the block 385. Otherwise, the process 300 returns to the block 340.

In the block 350, the vehicle computer 110 determines whether a key cycle has occurred after the second user input. As discussed above, the vehicle computer 110 determines a key cycle based on detecting that the vehicle 105 is engaged in an on-state where the vehicle has been transitioned from an on-state to an off-state and back to the on-state. The key cycle may be initiated by the user. If the vehicle computer 110 determines that a key cycle has occurred, then the process 300 continues in a block 360. Otherwise, the process 300 continues in a block 355.

In the block 355, the vehicle computer 110 maintains the selected assist feature(s) in the activated state. Said differently, the vehicle computer 110 continues to operate the vehicle 105 at least partially based on the selected assist feature(s), as discussed above. That is, the vehicle computer 110 does not deactivate the selected assist feature(s) to a deactivated state until after a key cycle. The process 300 returns to the block 345.

In the block 360, the vehicle computer 110 determines whether the vehicle 105 is operating in a road area based on data, e.g., image data and/or map data. For example, the vehicle computer 110 can compare the location of the vehicle 105 to the location of a road area specified by the map data, as discussed above. Additionally or alternatively, the vehicle computer 110 can analyze the image data, e.g., using image processing techniques, to identify a terrain of vehicle operation, one or more objects around the vehicle 105, etc., as discussed above. If the vehicle computer 110 determines that the vehicle 105 is operating in the road area, then the process 300 continues in the block 385. Otherwise, the process 300 continues to a block 365.

Figure 3B:
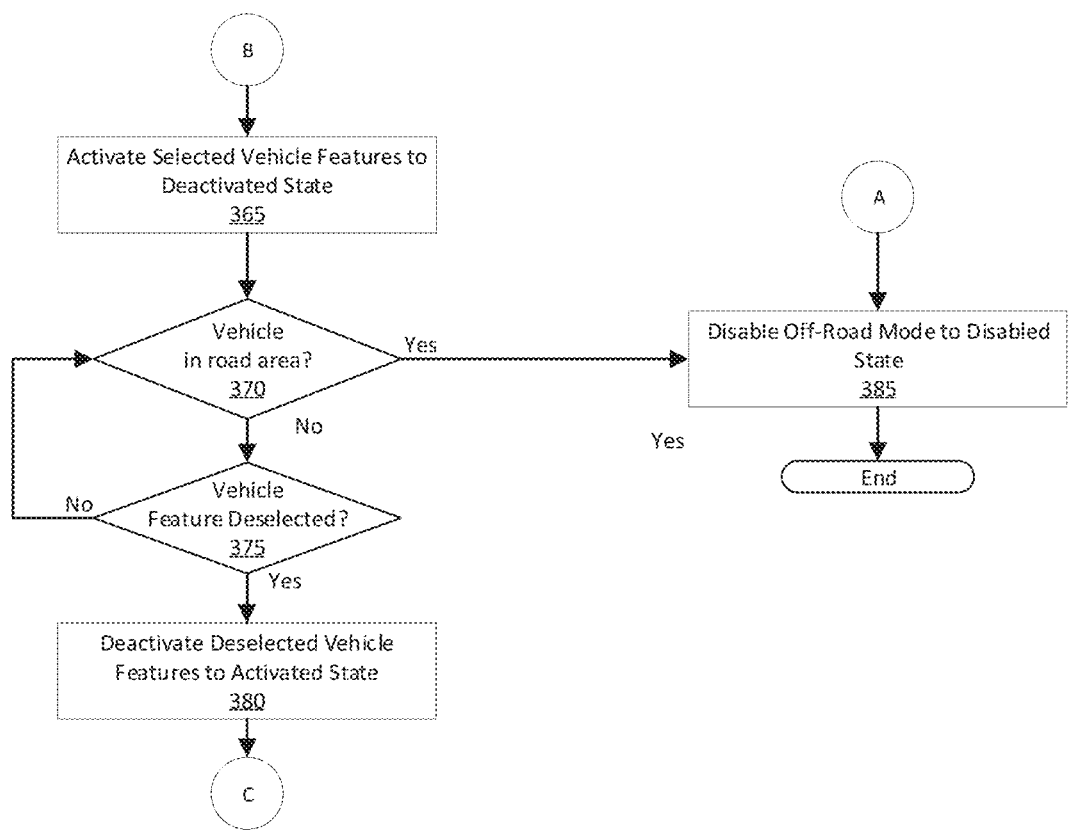
FIG. 3B is a second part of the flowchart of FIG. 3A.

Turning now to FIG. 3B, following the block 360 shown in FIG. 3A, in the block 365, the vehicle computer 110 deactivates the selected assist feature(s) to the deactivated state. In the deactivated state, the vehicle computer 110 suppresses the assist feature(s). That is, the vehicle computer 110 does not initiate the deactivated assist feature(s) to supplement or assist the user operation of the vehicle 105 in an off-road area. The vehicle computer 110 can record the deactivation of the selected assist feature(s), e.g., in a memory, as discussed above. Additionally, the vehicle computer 110 can suppress diagnostic data from the deactivated assist feature(s), as discussed above. The process 300 continues in a block 370.

In the block 370, the vehicle computer 110 determines whether the vehicle 105 is operating in a road area based on data, e.g., image data and/or map data. For example, the vehicle computer 110 can compare the location of the vehicle 105 to the location of a road area specified by the map data, as discussed above. Additionally or alternatively, the vehicle computer 110 can analyze the image data, e.g., using image processing techniques, to identify a terrain of vehicle operation, one or more objects around the vehicle 105, etc., as discussed above. If the vehicle computer 110 determines that the vehicle 105 is operating in the road area, then the process 300 continues in the block 385. Otherwise, the process 300 continues to a block 375.

In the block 375, the vehicle computer 110 determines whether at least one assist feature is deselected. For example, the sensors 115 of the HMI 118 can detect a third user input, e.g., the user pressing one or more virtual buttons deselecting a respective assist feature, as discussed above. In other words, the third user input may deselect one or more assist features. As another example, the HMI 118 can detect the third user input deselecting the off-road operation mode, e.g., the user pressing a virtual button on a touchscreen display to deselect the off-road operation mode, as discussed above. In such an example, the third user input deselects each of the deactivated assist features. The HMI 118 can then provide the third user input to the vehicle computer 110, and the vehicle computer 110 can then deselect the assist feature(s) based on the third user input. If the vehicle computer 110 determines at least one assist feature is deselected, then the process 300 continues in a block 380. Otherwise, the process 300 returns to the block 370.

In the block 380, the vehicle computer 110 activates the deselected assist feature(s) to the activated state. That is, the vehicle computer 110 may operate the vehicle 105 at least partially based on the activated assist feature(s). For example, the vehicle computer 110 may initiate one or more activated assist features to supplement or assist the user operation of the vehicle 105, e.g., in the road area. Additionally, the vehicle computer 110 can determine the activated assist feature(s) are operational based on diagnostic data, as discussed above. The process 300 returns to the block 325.

In the block 385, the vehicle computer 110 disables the off-road operation mode to the disabled state based on the vehicle 105 operating in a road area. For example, the vehicle computer 110 may actuate the HMI 118 to prevent the user from selecting the off-road operation mode and/or deactivating one or more assist features while the vehicle 105 is in a road area. Additionally, the vehicle computer 110 activates each deactivated assist feature to the activated state when the off-road operation mode is disabled from the enabled state to the disabled state, as discussed above. The process 300 ends following the block 385.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first," "second," "third," and "fourth," are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   upon determining a vehicle is in an off-road area based on sensor data, enable an off-road operation mode of the vehicle to an enabled state;
   then, upon receiving a first user input selecting the off-road operation mode, represent one or more assist features on a display in the vehicle;
   then select at least one of the assist features based on a second user input; and
   then, after a key cycle initiated by a user that engages the vehicle from an off state to an on state, deactivate the selected assist feature to a deactivated state.

2. The system of claim 1, wherein the instructions further include instructions to, upon determining the vehicle has moved from the off-road area to a road area, disable the off-road operation mode to a disabled state and activate the deactivated assist feature to an activated state.

3. The system of claim 1, wherein the instructions further include instructions to, upon receiving a third user input deselecting the off-road operation mode, disable the off-road operation mode to a disabled state and activate the deactivated assist feature to an activated state.

4. The system of claim 1, wherein the instructions further include instructions to, upon receiving a third user input selecting at least one deactivated assist feature, activate the selected assist feature to an activated state.

5. The system of claim 1, wherein the instructions further include instructions to select at least one assist feature based further on a previous selection.

6. The system of claim 1, wherein the instructions further include instructions to, after the key cycle, verify the vehicle is on the off-road area based on sensor data.

7. The system of claim 1, wherein the instructions further include instructions to prevent transition of the off-road operation mode to the enabled state based on determining the vehicle is operating in a road area.

8. The system of claim 1, wherein the instructions further include instructions to, after another key cycle, maintain the deactivated assist feature in the deactivated state based on determining the vehicle is in the off-road area via vehicle sensor data.

9. The system of claim 1, wherein the instructions further include instructions to prevent a diagnostic test of the deactivated assist feature.

10. The system of claim 9, wherein the instructions further include instructions to, upon activating the deactivated assist feature to an activated state, perform a diagnostic test of the activated assist feature.

11. A method comprising:
    upon determining a vehicle is in an off-road area based on sensor data, enabling an off-road operation mode of the vehicle to an enabled state;
    then, upon receiving a first user input selecting the off-road operation mode, representing one or more assist features on a display in the vehicle;
    then selecting at least one of the assist features based on a second user input; and
    then, after a key cycle initiated by a user that engages the vehicle from an off state to an on state, deactivating the selected assist feature to a deactivated state.

12. The method of claim 11, further comprising, upon determining the vehicle has moved from the off-road area to a road area, deactivating the off-road operation mode to a disabled state and activating the deactivated assist feature to an activated state.

13. The method of claim 11, further comprising, upon receiving a third user input deselecting the off-road operation mode, deactivating the off-road operation mode to a disabled state and activating the deactivated assist feature to an activated state.

14. The method of claim 11, further comprising, upon receiving a third user input selecting at least one deactivated assist feature, activating the selected assist feature to an activated state.

15. The method of claim 11, further comprising selecting at least one assist feature based further on a previous selection.

16. The method of claim 11, further comprising, after the key cycle, verifying the vehicle is in the off-road area based on sensor data.

17. The method of claim 11, further comprising preventing transition of the off-road operation mode to the enabled state based on determining the vehicle is operating in a road area.

18. The method of claim 11, further comprising, after another key cycle, maintaining the deactivated assist feature in the deactivated state based on determining the vehicle is in the off-road area via vehicle sensor data.

19. The method of claim 11, further comprising preventing a diagnostic test of the deactivated assist feature.

20. The method of claim 19, further comprising, upon activating the deactivated assist feature to an activated state, performing a diagnostic test of the activated assist feature.

* * * * *